United States Patent Office 3,544,618
Patented Dec. 1, 1970

3,544,618
ALKYL PERFLUOROALKYLENE AMIDATES
Edwin Dorfman and William E. Emerson, Grand Island, N.Y., assignors to Hooker Chemical Corporation, Niagara Falls, N.Y., a corporation of New York
No Drawing. Filed Aug. 17, 1967, Ser. No. 661,240
Int. Cl. C07c 103/14
U.S. Cl. 260—482
8 Claims

ABSTRACT OF THE DISCLOSURE

New alkyl perfluoroalkylene amidates of the formulae

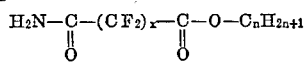

and

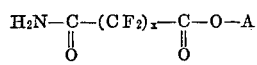

where $x$ is from 1 to 12, $n$ is from 1 to 25, and A is aryl substituted methyl of 7 to 21 carbon atoms, are produced either (a) by treatment with ammonia or a corresponding dialkyl perfluoroalkylene dicarboxylate, or (b) by treatment of the imide of the perfluoroalkylene dicarboxylic acid with a corresponding alcohol. They are useful intermediates in the preparation of perfluoroalkylenetriazine polymers.

---

This invention relates to new compositions of matter classified as alkyl perfluoroalkylene amidates of the formulae:

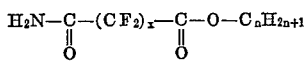

and

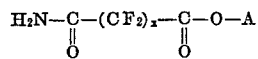

where $x$ is from 1 to 12, $n$ is from 1 to 25, and A is arylsubstituted methyl of from 7 to 21 carbon atoms. The compounds are prepared either (a) by treatment with ammonia of the corresponding dialkyl perfluoroalkylene dicarboxylates or (b) by treatment of the imide of the perfluoroalkylene dicarboxylic acid with the corresponding alcohol. An example of a dialkyl perfluoroalkylene dicarboxylate is dimethyl perfluoroglutarate which was prepared by A. L. Henne and W. J. Zimmerscheid, J. Am. Chem. Soc., 67, 1235 (1945). Another example is dimethyl perfluorosebacate which was prepared by treatment of perfluorosebacoyl chloride with methanol, and recovering the diester by vacuum distillation: B.P. 120–122 at 4 mm. Perfluorosebacoyl chloride B.P. 115–7 at 36 mm., was prepared from the acid in 86 percent yield using a fourfold quantity of thionyl chloride, ethyl acetate as solvent, and a catalytic amount of pyridine. Perfluorosebacic acid and perfluorotetradecanedioic acid are known compounds described by I. L. Knunyants et al., Proc. Acad. Sci. USSR, 129, 328 (1959) and I. L. Knunyants and M. N. Krasuskaya, Bull. Acad. Sci. USSR, 1963, 190. Dipropyl perfluorosebacate was prepared from perfluorosebacic acid, n-propyl alcohol and a catalytic amount of sulfuric acid. The by-product water of reaction was removed by distillation of the propyl alcohol-water azeotropic mixture. The dipropyl perfluorosebacate had a boiling point of 125–128° centigrade at 5 millimeters of mercury pressure (absolute). Diethyl difluoromalonate or dimethyl difluoromalonate may be produced by the method of C. E. Inman, R. E. Oesterling, and E. A. Tyczkowski, J. Am. Chem. Soc., 80, 6533–5 (1958). Perfluoropimelic acid, perfluoroazelaic acid and perfluorononanedioic acid may be made by electrolytic fluorination of the corresponding hydrocarbon acids by the method of Guenther, U.S. Pat. No. 2,606,206, which gave perfluorosebacic acid. The esters of these acids can be made by the procedures used for the preparation of the perfluorosebacic acid esters described above. Examples of imides are perfluorosuccinimide and perfluoroglutarimide, which were prepared by the method of A. L. Henne and W. F. Zimmer, J. Am. Chem. Soc., 73, 1103 (1951). Other homologous perfluoroalkanedioic acid imides may be prepared by this process when the corresponding perfluoroalkanedioic acid amides are used as starting materials.

Illustrative compounds embraced by this invention are:

methyl perfluoroglutaramidate (where $x=3$)
ethyl perfluoroglutaramidate (where $x=3$)
n-propyl perfluoroglutaramidate (where $x=3$)
isopropyl perfluoroglutaramidate (where $x=3$)
n-butyl perfluoroglutaramidate (where $x=3$)
benzyl perfluoroglutaramidate (where $x=3$)
methyl perfluorosebacamidate (where $x=8$)
n-propyl perfluorosebacamidate (where $x=8$)
methyl difluoromalonamidate (where $x=1$)
methylperfluorosuccinamidate (where $x=2$)
methyl perfluoroadipamidate (where $x=4$)
methyl perfluorosuberamidate (where $x=6$)
methyl perfluorotetradecanamidate (where $x=12$)

The alkyl perfluoroalkylene amidates of this invention are useful intermediates in the preparation of perfluoroalkylene triazine polymers, such as those disclosed in copending application Ser. No. 533,430, filed Mar. 11, 1966. These polymers are thermally stable and resistant to some solvents, while being soluble in other solvents, such as alkyl acetates, alkyl perfluoroalkanoates, and fluorinated solvents, such as fluorinated xylenes and fluorine-containing triazines.

TREATMENT WITH AMMONIA

When the compounds of this invention are prepared by treatment with ammonia of a corresponding diester of a perfluorinated dicarboxylic acid, the reaction is carried out in a substantially anhydrous medium.

It is preferred to use a solvent, such as methylene chloride, benzene, toluene, xylene, or ether. However, a solvent may not be necessary, especially if an excess of diester is used as the solvent. It is to be understood that a heel of monoester product may also be used as a solvent for the reaction.

The temperature of the reaction should be between about 78 and about 100 degrees centigrade. The preferred temperature range is between about minus 30 and about 30 degrees centigrade.

The reaction can be carried out at atmospheric pressure; however, pressures above and below atmospheric pressure may also be used.

Agitation during the reaction is preferred in order to avoid formation of localized by-products. One by-product to be minimized is the corresponding perfluoroalkylene diamide.

In general the mole ratios of ammonia to diester should be in a range between about 0.2 and about 0.7, with the preferred range being between about 0.35 and 0.5.

It is preferred to add the ammonia to the diester, especially in order to avoid the formation of by-products such as the corresponding diamide. This by-product formation is also minimized by operating at lower conversions by using less than molar equivalent amounts of ammonia.

Any perfluoroalkylene diamide formed as a by-product in the reaction, can be used as such, or can be converted to the corresponding dinitrile for use in polymerizations, or can be converted to the corresponding perfluoroalkylene diacid for recycle back into the process as the corresponding perfluoroalkylene diester. The perfluoroalkylene diamide may also be converted to the imide which can be converted to the products of this invention through the imide route described herein.

IMIDE TREATMENT

In accordance with this invention the compounds claimed herein can also be produced by treatment of imides of perfluoroalkanedioic acids of the formula:

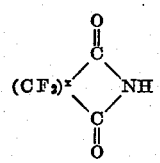

where $x$ is as defined above, with an alcohol of the formulae $C_nH_{2n+1}OH$ and AOH where $n$ is from 1 to 25 carbon atoms and A is aryl substituted methyl of 7 to 21 carbon atoms and recovering the product so produced.

The temperature range for this reaction is between about zero and about the reflux temperature of the reactants. This upper temperature is over about 100 degrees centigrade.

The reaction can be carried out at atmospheric pressure. However, pressures above and below atmospheric pressure may also be desirable.

A solvent is not required in conducting the reaction. However, an inert solvent, such as benzene, can be used.

Agitation is not required for effecting the process, however it is preferred. The reactants can be added in a number of ways, and it is unimportant in what order they are added. They can also be added simultaneously.

The reactants may be added in equivalent amounts. It is generally preferred however to use a slight molar excess of the alcohol over the imide.

It is important that this reaction be conducted under substantially anhydrous conditions in order to avoid hydrolysis and formation of other byproducts.

Whether using the ammonia treatment route or the imide route to obtain the products of this invention, the claimed compounds are recovered from the crude reaction mixture by distillation, by recrystallization of the product, or by solvent extraction of the impurities from the crude product. Where high purity is not required, it is preferred to strip off the excess alcohol which may be present in the reaction medium and recover the product as the residue.

Of the two methods described herein for producing the compositions of this invention, the cyclic imide route is preferred where the cyclic imide itself is readily available, because the reaction goes relatively easily with excess alcohol or equivalent amounts of alcohol, and especially because essentially one product is formed. However, the formation of the compound from the diester is preferred where the cyclic imide is not readily available or may be more expensive than the diester.

This invention is further illustrated in the examples below, wherein temperatures are in degrees centigrade and parts are by weight.

Example 1

Methyl perfluoroglutaramidate.—Perfluoroglutarimide (5 grams, 0.023 mole) and methanol (0.79 gram, 0.0246 mole), were sealed in a tube and heated to about 100 degrees centigrade. In 50 minutes the reaction was almost complete as indicated by infrared analysis. Heating was continued for about 90 minutes more to complete the reaction. A solid product was recrystallized from toluene and dried. It had a melting point of 45.0–45.5 degrees centigrade.

Analysis.—Calculated for $C_6H_5F_6NO_3$ (percent): C, 28.47; H, 1.99; N, 5.53. Found (percent): C, 28.40; H, 1.99; N, 5.62.

In a similar manner, by substituting perfluorosuccinimide (3.93 grams, 0.023 mole), for the perfluoroglutarimide used in the above reaction, methyl perfluorosuccinamidate can be obtained.

Example 2

Ethyl perfluoroglutaramidate.—In a manner after Example 1 ethyl perfluoroglutaramidate was produced from perfluoroglutarimide and ethanol. The product had a boiling point of 98 degrees centigrade at about 0.09 millimeter mercury.

Analysis.—Calculated for $C_7H_7F_6NO_3$ (percent): C, 31.47; H, 2.64; N, 5.24. Found (percent): C, 31.45; H, 2.53; N, 5.35.

Example 3 n-Propyl perfluoroglutaramidate.—In a manner after Example 1 n-propyl perfluoroglutaramidate was produced from perfluoroglutarimide and n-propanol. The product had a boiling point of 108 degrees centigrade at 0.17 millimeter mercury.

Analysis.—Calculated for $C_8H_9F_6NO_3$ (percent): C, 34.17; H, 3.23; N, 4.98. Found (percent): C, 34.17; H, 3.41; N, 5.05.

Example 4 iso-Propyl perfluoroglutaramidate.—In a manner after Example 1 iso-propyl perfluoroglutaramidate was prepared from perfluoroglutarimide and iso-propanol. The product had a boiling point of 5 degrees centigrade at 0.1 millimeter mercury.

Analysis.—Calculated for $C_8H_9F_6NO_3$ (percent): C, 34.17; H, 3.23; N, 4.98. Found (percent): C, 34.30; H, 3.34; N, 4.95.

Example 5 n-Butyl perfluoroglutaramidate.—In a manner after Example 1 n-butyl perfluoroglutaramidate was prepared from perfluoroglutarimide and n-butanol. The product had a boiling point of 118 degrees centigrade at 0.5 millimeter mercury.

Analysis.—Calculated for $C_9H_{11}F_6NO_3$ (percent): C, 36.62; H, 3.75; N, 4.75. Found (percent): C, 36.79; H, 3.68; N, 4.96.

Example 6

Benzyl perfluoroglutaramidate.—In a manner after Example 1 benzyl perfluoroglutaramidate was prepared from perfluoroglutarimide and benzyl alcohol. The product had a melting point of between 61 and 62 degrees centigrade (from toluene).

Analysis.—Calculated for $C_{12}H_9F_6NO_3$ (percent): C, 43.78; H, 2.76; N, 4.26. Found (percent): C, 43.61; H, 2.57; N, 4.28.

Example 7

Methyl perfluorosebacamidate.—To dimethyl perfluorosebacate (252 grams, 0.48 mole), in methylene chloride (700 milliliters), was added ammonia (5.8 grams, 0.34 mole), at between about 25 to about 29 degrees centigrade. The mixture was stirred for 7 hours. Crude methyl perfluorosebacamidate (110 grams) was obtained at 100 degrees centigrade at 0.25 millimeter mercury. This product was recrystallized from toluene which gave white crystals (61 grams) with a melting point of between 115 and 116 degrees centigrade.

Analysis.—Calculated for $C_{11}H_5F_{16}NO_3$ (percent): C, 26.26; H, 1.00; N, 2.78. Found (percent): C, 26.13; H, 1.06; N, 2.84.

In a similar manner by substituting dimethyl perfluorosuberate (201 grams, 0.48 mole), for the dimethyl perfluorosebacate used in the above reaction, methyl perfluorosuberamidate can be obtained.

In a similar manner, by substituting methyl difluoromalonate (81 grams, 0.48 mole), for the dimethyl perfluorosebacate used in the above reaction, methyl difluoromalonamidate can be obtained.

In a similar manner, by substituting methyl perfluoroadipate (152.5 grams, 0.48 mole), for the dimethyl perfluorosebacate used in the above reaction, methyl perfluoroadipamidate can be obtained.

Example 8 n-Propyl perfluorosebacamidate.—To di-n-propyl perfluorosebacate (115 grams, 0.2 mole) in methylene chloride (150 milliliters) was added ammonia (2.21 grams, 0.13 mole) in a reaction flask equipped with a Dewar condenser at minus 78 degrees centigrade and with a magnetic stirring bar. When the ammonia was consumed, the reaction mixture was subjected to distillation at atmospheric pressure to remove the methylene chloride, then under vacuum at one millimeter mercury to remove unreacted ester. When solidified product appeared in the condenser the distillation was stopped, and the n-propyl perfluorosebacamidate containing some perfluorosebacamide was recovered.

Although this invention has been illustrated by citing specific details of given species embraced within the scope of this invention, it is to be understood that various modifications within the invention are possible, some of which have been referred to above. For instance, alkyl perfluoroetheralkylene amidates may be made. These compounds have the formulae:

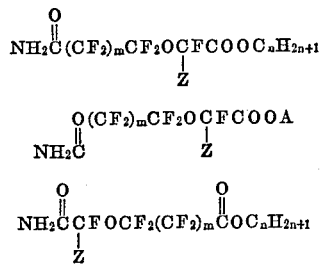

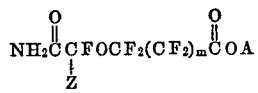

and

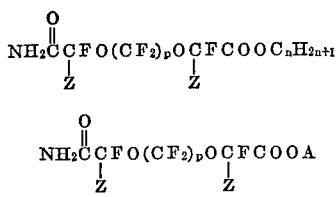

where $m$ is an integer of from 0 to 12, $n$ is an integer of from 1 to 25 carbon atoms, and A is aryl-substituted methyl of 7 to 21 carbon atoms,

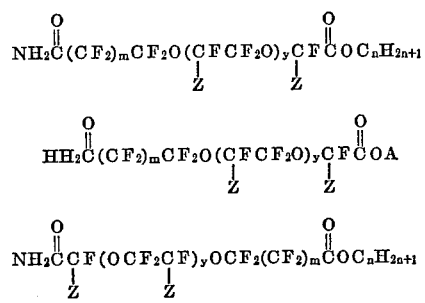

where $p$ is an integer of from 2 to 12 and $n$ and A are as defined above,

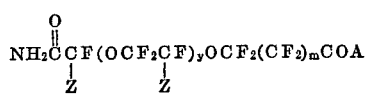

and $$NH_2\overset{O}{\underset{\|}{C}}CF(OCF_2CF)_yOCF_2(CF_2)_mCOA$$
$$\qquad\quad\; Z \qquad\qquad\qquad Z$$

where $y$ is an integer of from 0 to 100, and $p$, $m$, $n$ and A are as defined above and

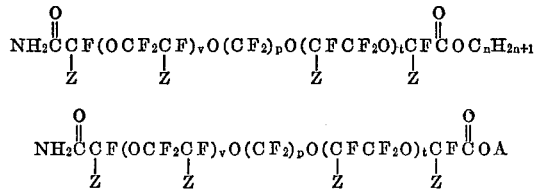

where $v$ plus $t$ is an integer of from 0 to 100, and $p$, $m$, $n$ and A are defined above, and

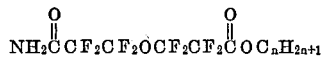

and

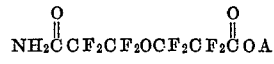

where $n$ and A are as defined above

In each of the above formulae Z is selected from the group consisting of fluorine and $CF_3$. Illustrative compounds embraced by this process are:

methyl 3-oxaperfluorosuberamidate
methyl 3-oxaperfluoro-2-methylpimelamidate
methyl 3,9-dioxaperfluoroundecanedioic acid amidate
methyl 3,6,9,12-tetraoxaperfluorotetradecanedioic acid amidate Other compounds embraced by this process are alkyl amidates of branched perfluoroalkylene dicarboxylic acids such as the following illustrative examples:

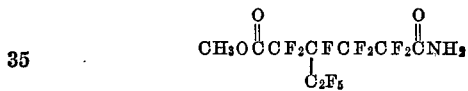

and

Other starting materials embraced by this inventor are haloalkyl perfluoroalkylene dicarboxylates of the formula:

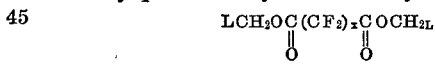

where $x$ is as defined above and L is haloalkyl of 1 to 24 carbon atoms where the halogen(s) is selected from chlorine and fluorine, with the balance of the haloalkyl group being hydrogen. An example of this type of partially halogenated alcohol diester would be difluoroethyl hexafluoro glutarate and the product, after treatment with ammonia in accordance with this invention would be difluoroethyl hexafluoro glutaramidate.

What is claimed is:
1. A method for the production of alkyl perfluoroalkylene amidates of the formula:

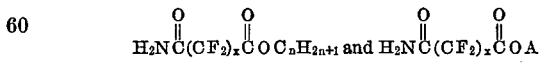

which comprises treating a perfluoroalkylene imide of the formula:

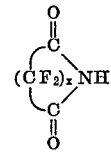

with an alcohol selected from the group consisting of $C_nH_{2n+1}OH$ and AOH, at approximately equimolar amounts, from about 0° C. to about reflux temperatures of the reactants, and recovering the products produced, wherein $n$ is from 1 to 25, A is aryl substituted methyl of 7 to 21 carbon atoms, and X is from 1 to 12.

2. The process of claim 1 wherein the alcohol employed is of the formula $C_nH_{2n+1}OH$, where $n$ is from 1 to 25.

3. The process of claim 1 wherein the alcohol employed is AOH, where A is aryl substituted methyl of 7 to 21 carbon atoms.

4. The process of claim 3 wherein the alcohol employed is benzyl alcohol.

5. The process of claim 2 wherein the alcohol employed is methanol.

6. The process of claim 2 wherein the alcohol employed is ethanol.

7. The process of claim 2 wherein the alcohol employed is propanol.

8. The process of claim 2 wherein the alcohol employed is butanol.

References Cited

UNITED STATES PATENTS

| | | | |
|---|---|---|---|
| 2,502,478 | 4/1950 | Padbury et al. | 260—482 |
| 2,523,470 | 9/1950 | Kropa et al. | 260—482 XR |
| 2,794,012 | 5/1957 | Tawney | 260—482 XR |

LORRAINE A. WEINBERGER, Primary Examiner

PAUL JOHN KILLOS, Assistant Examiner

U.S. Cl. X.R.

260—281, 326.5, 465.2, 485, 537, 561